United States Patent
Prabhat et al.

(10) Patent No.: US 11,651,016 B2
(45) Date of Patent: May 16, 2023

(54) SYSTEM AND METHOD FOR ELECTRONIC TEXT CLASSIFICATION

(71) Applicant: Walmart Apollo, LLC, Bentonville, AR (US)

(72) Inventors: Gyan Prabhat, Munger (IN); Riyanka Bhowal, Howrah (IN); Debanjana Banerjee, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 492 days.

(21) Appl. No.: 16/536,564

(22) Filed: Aug. 9, 2019

(65) Prior Publication Data
US 2020/0050618 A1 Feb. 13, 2020

Related U.S. Application Data

(60) Provisional application No. 62/778,968, filed on Dec. 13, 2018.

(30) Foreign Application Priority Data

Aug. 9, 2018 (IN) .............................. 201811029943

(51) Int. Cl.
| | |
|---|---|
| *G06F 17/00* | (2019.01) |
| *G06F 16/35* | (2019.01) |
| *G06F 40/103* | (2020.01) |
| *G06F 18/21* | (2023.01) |
| *G06F 18/24* | (2023.01) |

(52) U.S. Cl.
CPC ........ *G06F 16/353* (2019.01); *G06F 18/2178* (2023.01); *G06F 18/24765* (2023.01); *G06F 40/103* (2020.01)

(58) Field of Classification Search
CPC ..... G06F 16/353; G06F 40/103; G06K 9/626; G06K 9/6263
See application file for complete search history.

(56) References Cited

U.S. PATENT DOCUMENTS

| | | |
|---|---|---|
| 7,707,129 B2 | 4/2010 | Zhuang et al. |
| 7,877,345 B2 | 1/2011 | Nigam et al. |

(Continued)

OTHER PUBLICATIONS

Ahmet Taspinar, "Text Classification & Sentiment Analysis tutorial / blog", Data Science Central, Jan. 11, 2016, pp. 1-7.

(Continued)

*Primary Examiner* — Mohammed H Zuberi
(74) *Attorney, Agent, or Firm* — Morgan, Lewis & Bockius LLP; Manita Rawat

(57) ABSTRACT

Systems, method, and computer-readable mediums for automated text classification, and particularly a mechanism for performing binary classification using only a set of positive labeled data as training data and having a large set of unlabeled data, where the algorithm can function without any information regarding the negative class. The disclosed classification systems and methods may use a text classification process which automatically classifies text based on the current positive training data available, but identifies additional words which can be added to the positive training data such that future iterations of the text classification can better identify the positive class of text.

15 Claims, 4 Drawing Sheets

(56) References Cited

U.S. PATENT DOCUMENTS

| | | | | |
|---|---|---|---|---|
| 8,019,763 B2* | 9/2011 | Wang | | G06F 16/951 |
| | | | | 707/738 |
| 8,260,788 B2* | 9/2012 | Saito | | G06F 16/951 |
| | | | | 707/748 |
| 8,407,211 B1* | 3/2013 | Lewis | | G06F 16/29 |
| | | | | 707/722 |
| 8,533,319 B2* | 9/2013 | Draugelis | | H04L 41/0609 |
| | | | | 709/224 |
| 8,606,815 B2 | 12/2013 | Chen et al. | | |
| 8,671,069 B2* | 3/2014 | Chang | | G06N 5/02 |
| | | | | 706/52 |
| 8,713,007 B1* | 4/2014 | Korolev | | G06N 20/00 |
| | | | | 707/729 |
| 8,819,002 B2* | 8/2014 | Figueroa | | G06F 16/2425 |
| | | | | 707/726 |
| 8,849,058 B2* | 9/2014 | Kennedy | | G06T 7/97 |
| | | | | 382/274 |
| 8,868,402 B2* | 10/2014 | Korolev | | G06F 16/24578 |
| | | | | 707/708 |
| 8,983,975 B2* | 3/2015 | Kenton | | G06Q 30/00 |
| | | | | 706/14 |
| 8,996,350 B1* | 3/2015 | Dub | | G06F 16/353 |
| | | | | 707/673 |
| 9,060,175 B2* | 6/2015 | Wang | | H04N 19/156 |
| 9,105,008 B2 | 8/2015 | Popescu et al. | | |
| 9,213,687 B2 | 12/2015 | Au | | |
| 9,235,814 B2* | 1/2016 | Wang | | G06N 5/025 |
| 9,292,493 B2 | 3/2016 | Chandramouli et al. | | |
| 9,330,167 B1* | 5/2016 | Pendar | | G06F 16/328 |
| 9,330,722 B2* | 5/2016 | Chang | | G11B 27/28 |
| 9,367,814 B1* | 6/2016 | Lewis | | G06F 16/353 |
| 9,559,993 B2* | 1/2017 | Palakovich | | H04L 51/04 |
| 9,563,622 B1* | 2/2017 | Anderson | | G06F 16/353 |
| 9,582,759 B2* | 2/2017 | Jayaraman | | G06N 5/02 |
| 9,846,836 B2* | 12/2017 | Gao | | G06N 3/082 |
| 10,217,058 B2* | 2/2019 | Gamon | | G06N 20/00 |
| 10,242,105 B2* | 3/2019 | Du | | G06F 16/951 |
| 10,298,535 B2* | 5/2019 | Dange | | G06F 16/24578 |
| 10,593,350 B2* | 3/2020 | Liu | | H04M 3/42221 |
| 10,621,428 B1* | 4/2020 | Cai | | G06T 7/11 |
| 10,671,926 B2* | 6/2020 | Jayaraman | | G06N 5/02 |
| 10,706,359 B2* | 7/2020 | Jayaraman | | G06N 20/00 |
| 10,754,883 B1* | 8/2020 | Kannu | | G06F 16/3334 |
| 10,878,017 B1* | 12/2020 | L'Huillier | | G06F 40/40 |
| 10,878,144 B2* | 12/2020 | Nendorf | | G06F 30/20 |
| 10,909,585 B2* | 2/2021 | L'Huillier | | G06Q 30/0281 |
| 10,977,667 B1* | 4/2021 | L'Huillier | | G06F 16/3344 |
| 2005/0228783 A1* | 10/2005 | Shanahan | | G06F 16/3347 |
| | | | | 707/E17.08 |
| 2006/0248055 A1* | 11/2006 | Haslam | | G06F 16/382 |
| 2006/0248094 A1* | 11/2006 | Andrews | | G06Q 10/00 |
| 2007/0183655 A1* | 8/2007 | Konig | | G06K 9/6282 |
| | | | | 382/224 |
| 2007/0203908 A1* | 8/2007 | Wang | | G06F 16/3331 |
| | | | | 707/E17.069 |
| 2008/0082352 A1* | 4/2008 | Schmidtler | | G06Q 10/10 |
| | | | | 705/2 |
| 2008/0086433 A1* | 4/2008 | Schmidtler | | G06N 20/10 |
| | | | | 707/E17.09 |
| 2008/0275833 A1* | 11/2008 | Zhou | | G06N 7/005 |
| | | | | 706/45 |
| 2010/0312725 A1* | 12/2010 | Privault | | G06N 5/043 |
| | | | | 706/54 |
| 2011/0106732 A1* | 5/2011 | Chidlovskii | | G06F 16/95 |
| | | | | 706/46 |
| 2015/0286945 A1* | 10/2015 | Brewster | | G06N 5/04 |
| | | | | 706/46 |
| 2019/0251164 A1* | 8/2019 | Ding | | G06K 9/6256 |
| 2020/0050618 A1* | 2/2020 | Prabhat | | G06F 16/353 |
| 2020/0286002 A1* | 9/2020 | Szanto | | G06K 9/6267 |

OTHER PUBLICATIONS

Daniel Jurafsky et al., "Naive Bayes and Sentiment Classification", Chapter 6, Aug. 7, 2017, pp. 1-19.

Hang Cui et al., "Comparative Experiments on Sentiment Classification for Online Product Reviews", pp. 1265-1270.

International Search Report and Written Opinion dated Nov. 15, 2019 in International Application No. PCT/US2019/045860, 19 pages.

* cited by examiner

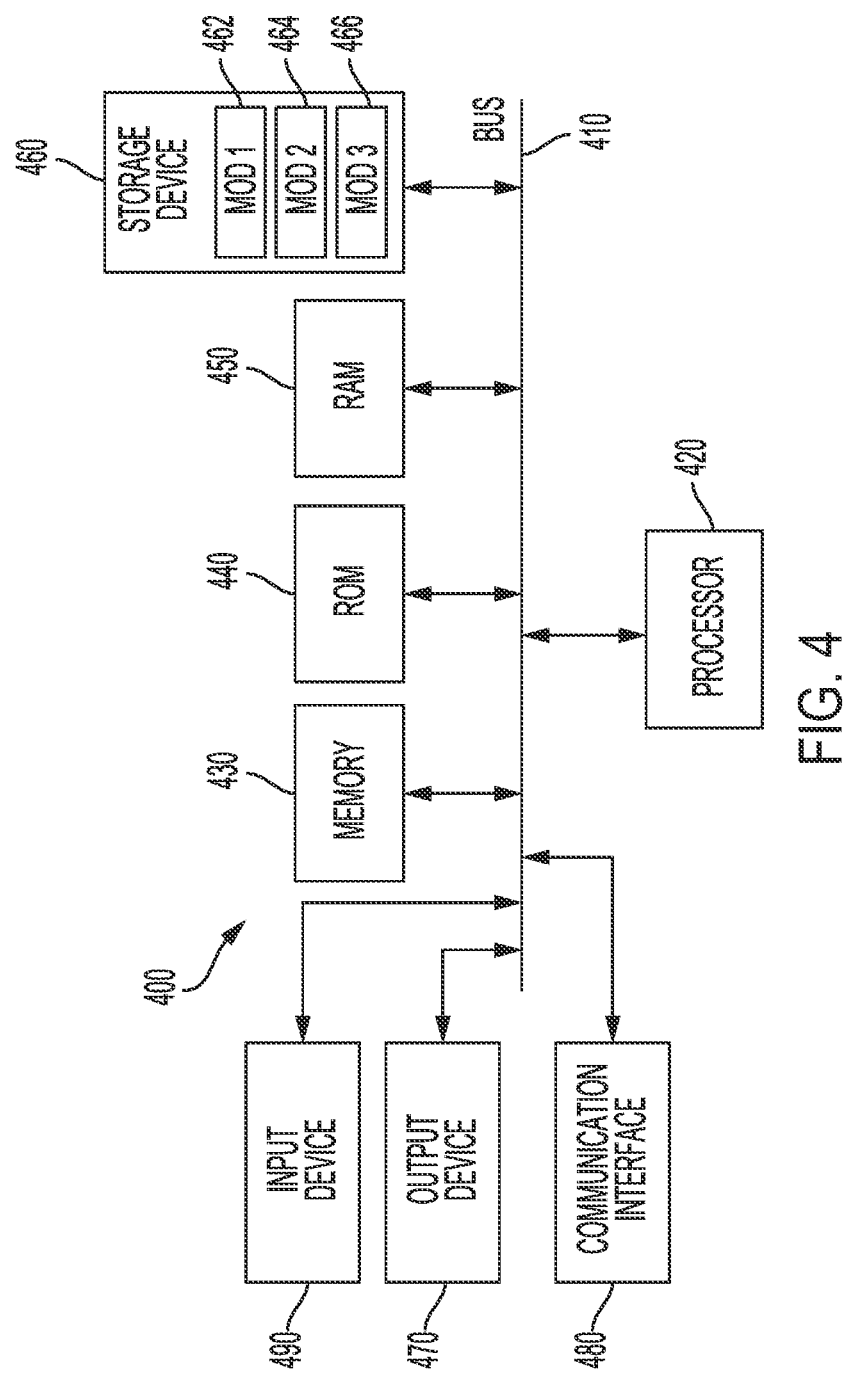

SYSTEM AND METHOD FOR ELECTRONIC TEXT CLASSIFICATION

PRIORITY

The present application claims priority to Indian Provisional Application No. 201811029943, filed Aug. 9, 2018, and U.S. Provisional Patent Application No. 62/778,968, filed Dec. 13, 2018, the contents of which are incorporated herein in their entirety.

BACKGROUND

1. Technical Field

The present disclosure relates to electronic text classification, and more specifically to automatically partitioning electronic text using limited positively-labeled training data and no negatively-labeled training data.

2. Introduction

In the modern world, new text is produced at incredible speeds. Unfortunately, determining when and how to respond to the new text being generated is a time consuming process using typical automatic text classification algorithms. In addition, these text classification algorithms can be prohibitively expensive due to their reliance on substantial amounts of training data, with both positive examples and negative examples for any given classification. This need for substantial amounts of training data is further aggravated in scenarios where the text is highly imbalanced, such that only a small percentage of the text should be classified in a particular way. Current automatic text classification systems cannot perform without training data, and are inefficient when limited training data is available.

Technical Problem

How to program a computer system to classify text when training data is unavailable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A method configured according to this disclosure can include: receiving a plurality of text documents, wherein the plurality of text documents are divided into a labeled portion and an unlabeled portion, the unlabeled portion being larger in quantity than the labeled portion; calculating, via a processor, a metric for each respective text document in the labeled portion of the plurality of text documents; performing, via the processor, a preliminary classification of each text document in the unlabeled portion of the plurality of text documents based on the metric, to yield preliminary classified data; ranking, via the processor, the preliminary classified data in a descending order based on the metric; and performing, via the processor, a second classification on the preliminary classified data in the descending order.

A system configured according to this disclosure can include: a processor; and a computer-readable storage medium having instructions stored which, when executed by the processor, cause the processor to perform operations comprising: receiving a plurality of text documents, wherein the plurality of text documents are divided into a labeled portion and an unlabeled portion, the unlabeled portion being larger in quantity than the labeled portion; calculating a metric for each respective text document in the labeled portion of the plurality of text documents; performing a preliminary classification of each text document in the unlabeled portion of the plurality of text documents based on the metric, to yield preliminary classified data; ranking the preliminary classified data in a descending order based on the metric; and performing a second classification on the preliminary classified data in the descending order.

A non-transitory computer-readable storage medium configured according to this disclosure can have instructions stored which, when executed by a computing device, cause the computing device to perform operations which include: receiving a plurality of text documents, wherein the plurality of text documents are divided into a labeled portion and an unlabeled portion, the unlabeled portion being larger in quantity than the labeled portion; calculating a metric for each respective text document in the labeled portion of the plurality of text documents; performing a preliminary classification of each text document in the unlabeled portion of the plurality of text documents based on the metric, to yield preliminary classified data; ranking the preliminary classified data in a descending order based on the metric; and performing a second classification on the preliminary classified data in the descending order.

BRIEF DESCRIPTION OF THE DRAWINGS

FIG. 4 illustrates an example computer system.

DETAILED DESCRIPTION

Figure 1:
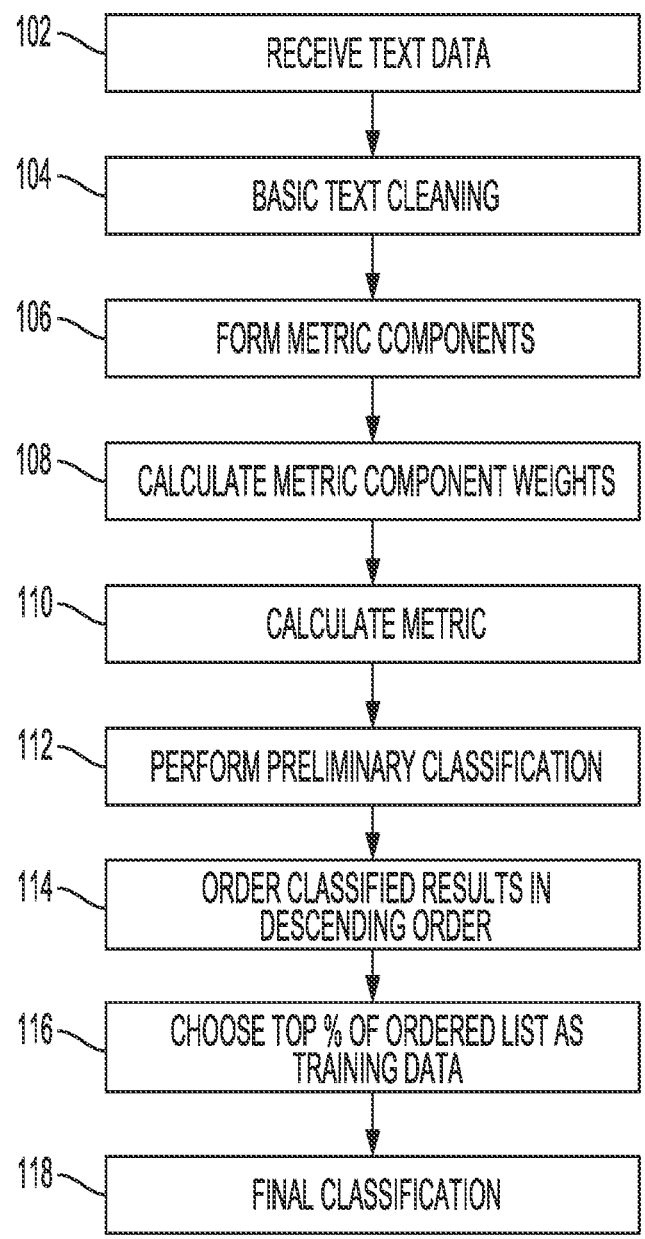
FIG. 1 illustrates a first example method embodiment.

Various embodiments of the disclosure are described in detail below. While specific implementations are described, it should be understood that this is done for illustration purposes only. Other components and configurations may be used without parting from the spirit and scope of the disclosure.

The present disclosure addresses deficiencies in current automated text classification, and particularly provides a mechanism for performing imbalanced binary classification using only a set of positive labeled data as training data and having a large set of unlabeled data, where the method can function without any information regarding the negative class. The disclosed system identifies cases of a rare event, such as a positive class, for which very few labeled training examples are at hand. However, the known examples may not capture the wide variety of possibilities of the positive class. For example, for a given class, the system may have a few examples for a given class, but insufficient data to link a given text (which should be in the class) directly to the class. In addition, in the disclosed system, no training examples of the negative class need be available. The disclosed solutions apply to one-class classification, which is known as PU (Positive/Unlabeled) Learning, also known as Learning through Positive & Unlabeled data.

Previously known methods which exist in the PU Learning domain require an exhaustive set of positive examples in order to perform classification, and they do not capture imbalanced PU Learning techniques. By contrast, the disclosed system do not require this amount of training data. The disclosed methods and systems are designed to classify the text into two classes: Success/Reportable, and Failure/Non-reportable. In particular the disclosed methods and systems are designed to classify the text when the classes are highly imbalanced, such as a 1% Success classification and a 99% Failure classification. This high imbalance between the positive, minority classification (such as a 1% classification) and the negative, majority classification (the 99% classification) makes identification of such classes of data more difficult when the amount of training data is limited to only examples of the positive class. Prior computer text classification methods are not able to process this type of data.

To enable such classification using only positive observations, the disclosed classification system may use a text classification process which automatically classifies text based on the current positive training data available, but identifies additional words which can be added to the positive training data such that future iterations of the text classification can better identify the positive class of text. In some configurations, the additional words can require approval of the words prior to their use in future iterations, for example by artificial intelligence or a human supervisor. This process is automated and does not need any human intervention, thereby mitigating the risk of overlooking potential cases which can be harmful. The identification of additional words is mandatory to capture new variety of rare cases. In other configurations the additional words can be added to the list of positive words upon the words reaching a level of certainty in their correlation to positive classifications.

For example, suppose the task is to identify malicious emails. Historically, examples of only a few malicious emails may be saved, but the corresponding non-malicious emails were not kept. Also, it is known that less than 0.01% of the vast amount of emails received every day are actually found to be malicious. Most existing classification systems would either require a good amount of training data on both malicious and non-malicious emails or, at least, a huge number of training data on malicious emails (malicious emails being the class of interest). Malicious emails being rare events, obtaining huge amounts of training examples for this class may not be feasible and which is where the disclosed concepts and principles outperform and improve the existing systems.

The classification process disclosed herein may operate as follows. Given the relatively small list of only positive training data (compared to unlabeled cases), and no negative training data, the system obtains a text document to determine if the text document is a success case or a failure case. A metric, or score, for the text document is generated. The metric may have three initial components: a sentiment score, a word function score, and a distance score. The sentiment score may identify a sentiment of the text based on values assigned to given words based on the relationship of those words to the success classification. In some embodiments, the classification process may be searching for text that has a negative, or at best neutral, sentiment associated with it. For example, the reportable may be a problem with a product. In such as case the "success" case likely has negative sentiment. The sentiment can be determined through pre-trained lexicons, such as Valence Aware Dictionary and sentiment Reasoner.

The word function score may be determined by a function using an identified number of keywords, or "hotwords," identified in the text document. Hotwords can be identified by starting with a given set, then finding words similar to those in the given set within a semantic space. If the probability of the occurrence of a word within the positive class is higher, then the word is identified as a hot-word. In general, the word function should be an increasing function such that when the number of keywords increases, the function increases. For example, the function may be a factorial of the number of keywords identified, and more specifically, the total number of keywords*a factorial of the number of unique keywords. In other configurations, the function may be the square of the number of keywords identified, the square root of the number of keywords identified, etc.

The distance score may generate distance between text in a document term matrix. In one example, the distance may be a vector identifying how similar one unlabeled text document is to one or more of the positive training examples provided. The distance may be a Euclidian distance between two vectors (vector representations of a reportable text document and the same for an unlabeled document). More specifically, the disclosed system uses one reportable vector and one unlabeled vector, then calculates the distance between the two. The distance between a non-reportable or unlabeled and each reportable may be determined, and averaged, to determine the distance. In some cases, the distance between the unlabeled case and the reportable will be small, indicating that the unlabeled case is close to, and thus similar to the reportable. Thus, a small distance may indicate a close relation between the unlabeled case and the reportable case and the distance may be negative in determining the metric when a close distance relationship is desired.

The system may also generate weights for the sentiment score, the function score, and the distance score based upon a goal, or priority, of the system. For example, the weights may vary based on if the system is seeking to maximize recall, precision, or accuracy of the classification process. The weights may be determined by filtering each of the components of the metric to maximize the desired outcome. For example, the weights can be computed iteratively by running the algorithm, thereby computing the recall/precision/accuracy (whichever category is being maximized) at every iteration, and then choosing the set of weights for which maximum value of the desired quotient is obtained. The respective weights are multiplied by the corresponding scores, and the sum of the resulting values is the overall metric. Written as an equation, this formula appears as follows:

$$\text{Metric}=(\text{sentiment weight} \times \text{sentiment score})+(\text{function weight} \times \text{function score})+(\text{distance weight} \times \text{distance score})$$

As noted above the signs of the equation may be adjusted to account for the sentiment score and distance. For example, $-0.01980805*\text{SentimentScore}+0.25185488*g(\#\text{Hotwords})-0.72833708*\text{DistanceFromReportables}$.

The calculated metric can then be used as part of a preliminary classification, where the text documents are ordered based on their metric. For example, those text documents which appear to be reportable based on their metrics will be ordered at the "top" of the list, and those text documents which do not appear to be reportable based on their metrics will be at the "bottom" of the list. A similar list may also be created for non-reportable cases. Having ordered the list based on the likelihood that a particular text document will be reportable, an additional (slower, more robust) classification can begin going through the list, beginning with those text documents which are most likely going to test positive. For example, this information may be used as training data for a second, additional classification. In effect this first stage searches for more reportable cases to add to the existing list of reportable cases, and uses that combined data for training data for the second classification.

The first stage of classification is based on the above defined metric. Two thresholds are computed on the metric—one depending on the prior notion of the rate of imbalance, and the other depending on the quality of the labeled reportables (training data). Please note that for this exercise, the only training data available is from the Positive (or, Success/Reportable) class which is, in fact, a rare class. Hence, the amount and thereby the quality (exhaustiveness) of the training data in capturing all types of positive (reportable) examples may not be up to the mark. These two thresholds are then added to the system as parameters.

The objective of the first stage of classification is to gather representative training data having examples from both the classes (Success & Failure) in the right proportions. This expanded training data can then be used to perform a second stage of classification. By using the disclosed metric to do an initial classification, ordering the text documents, and performing a second classification in an order determined by the metric, the system operates more efficiently/quickly to classify those text documents which are reportable than other systems. At no point in time should the system exclude the second stage of classification. While the first stage of classification is based on heuristics, it is in the second stage that the data is passed through a semi-supervised classifier which dictates the final classification. In addition, the system can, upon reaching text documents having a predetermined metric score, eliminate the second classification process, thereby further reducing the computational requirements of the automatic classification system. This improves speed and efficiency, allowing more resources to use the computer system. The system automates, speeds up and mitigates the accuracy risks associated with a sensitive classification task performed through other means. Furthermore, not only does the system not require any negative training data to function, it can work with a very low amount of positive training data. Because the positive (Success/Reportable) class is a rare class, training instances of this class are difficult to gather, and that is why the system is made to function on only limited positive examples and no negative example for training.

As the system iteratively identifies text documents which are reportable, additional words can be added to the list of keywords used by the system to identify reportable documents. In this manner, the system is iteratively improving its capacity to identify reportable documents.

Consider the following example. A large number of electronic text documents are received, the text documents being transcripts from a call center and online reviews. A certain number of these text documents need to be reported to, for example, computers, supervisors, reviewers, or other personnel that can identify trends or information from the text documents. However most of the text documents do not meet that need. In addition, only a few examples of previous text documents (transcripts or online reviews) have been provided. This is the "positive" training data. Essentially, the task given is "find more transcripts/online reviews like these." No examples of negative training data are given. Likewise, it can function on very low amounts of positive training examples.

This classification can be tricky because there can be a very thin line between reportability and non-reportability. Consider the distinction between 'Bought a bike; came home and the handles broke': Reportable 'Bought a bike a year ago; came home and the handles broke': Non-Reportable To fulfill the task, the system may first construct a list of keywords based on a commonly used words or phrases within the positive training data. The keywords may also be predetermined or previously provided. These words or phrases can be filtered by n-gram length, such as bigrams or trigrams, such that the most common single words are identified, the most common bigrams (two words) are identified, the most common trigrams (three word combinations) are identified, etc. This can identify the most common words or phrases, which can then be filtered out by word/phrase type (removing common words such as "a" and "the").

Having constructed the list of keywords based on the positive training data, the system generates a metric of each text document, then ranks the text documents based on their respective metric scores. The system then performs a final/second classification of the text documents using a top chunk as training data and may proceed in an order based on the ranking provided. The first classification stage provides confident labels to the unlabeled cases. These cases are then ordered by a confidence quotient (which is the same as the metric). A top chunk of these ordered cases (the predictions with a highest confidence level) is then appended with the few positive training examples acquired, thereby obtaining a representative training set which is then used as training data for the second layer of classification. The second stage of classification then classifies the text documents based on the confidence level ranking of the text documents. The ranking of individual text documents during the second stage of classification can be performed in parallel with one another.

These and other variations shall be further described using the illustrated figures. FIG. 1 illustrates a first example method embodiment. As illustrated, the system receives electronic text data (102), and perform basic text cleaning (104). At this point, common words such as "the", "a", etc., can be filtered out of the text documents (or copies of the text documents which are saved in a cache for manipulation purposes). Similarly, the list of keywords can be initialized based on commonalities in the positively labeled text documents received.

The system can then form metric components (106) for each respective text document. This can be a sentiment score determined using a sentiment analysis algorithm; a function score based on a function (such as the factorial function) using the number of keywords detected in the text document as input; and a distance score generated by measuring the distance between at least one vector in the positive examples and a vector of the current text document.

The system also generates metric weights (108) based on a priority of the system for a given set of text documents. Exemplary priorities of the system can include seeking to maximize the recall of the system, the precision of the system (the closeness of newly identified text documents to one another), and the accuracy of the system (the closeness of the newly identified text documents to the positive examples provided). The weights of all three scores (the sentiment score, the function score, and the distance score) can be modified according to the priority selected. In some configurations, a system user can select the system priority, whereas in other configurations the system priority can be automatically determined by a processor based on patterns of text document identification over various iterations.

The system calculates a metric (110) for each text document using the respective scores and weights, then performs a preliminary classification (112) of the text document based on that metric. For example, in some configurations, the metric may correspond to a likelihood percentage that the text document will need to be reviewed by a human being or otherwise reported, such that a metric score of "85" means that there is an 85% likelihood that the text document is reportable. The system can order the text documents which have been preliminarily classified (114). Continuing with the above example, the order can be a descending order, such that at the top of the list of ranked text documents is a text document with a "99%" likelihood of being reportable, and at the bottom of the list is a text document with a "1%" likelihood of being reportable. This metric can provide an estimate of the probability of reportability.

The system can then choose a top percentage of the list as new training data (116) and can also begin a final classification (118) of the documents in the ranked order. A user may select that top percentage that is used. Generally, in this manner, the documents which are most likely to be reportable proceed through final classification first, and those documents which are less likely to be reportable proceed through the final classification last. In some configurations, the system can terminate the final classification (118) process when the likelihood of a reportable document drops below a predetermined threshold of the metric. In addition or as an alternative, the documents which are least likely to be reportable are ordered and used as training data, in a similar fashion. In another example, anything that is not included as reportable is placed in to the non-reportable classification, the top percentage taken and used as training data.

Figure 2:
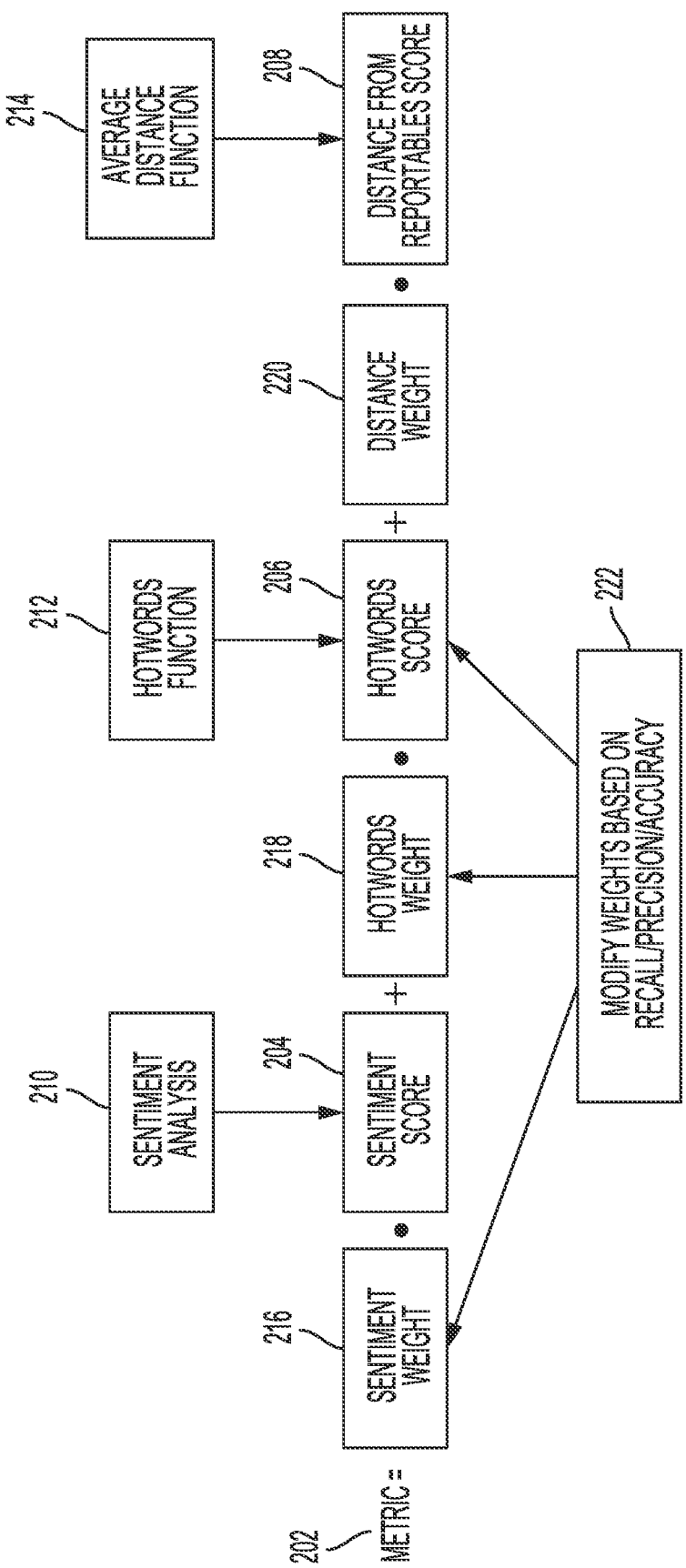
FIG. 2 illustrates an example metric calculation.

FIG. 2 illustrates an example metric calculation. In this example, the metric 202 for a respective text document is calculated. For the text document a sentiment analysis 210 is performed on the words within the text document, such that the respective sentiment score 204 is calculated. Also performed are the hotwords function 212 (also known as a keywords function) as described above to yield the hotwords score 206 and the average distance function 214 to yield the distance from reportables score 208. As a user selects a priority, the system modifies weights 216, 218, and 220 based on that priority 222.

The sentiment analysis can be performed with the help of pre-trained lexicons. The hotword function is distinctly an increasing (at an increasing rate) function of the number of hotwords present in a case. A highly skewed function of the number of keywords present is used for this purpose such that the metric value does not work in presence of too many keywords (hotwords). The average distance is computed taking the semantic distance between two cases (the cases being reviews, complains, emails, etc. which are essentially textual in nature). The conversion from text to numbers (vectors) is obtained by computing a Document Term Matrix and performing a Latent Semantic Analysis on it.

Figure 3:
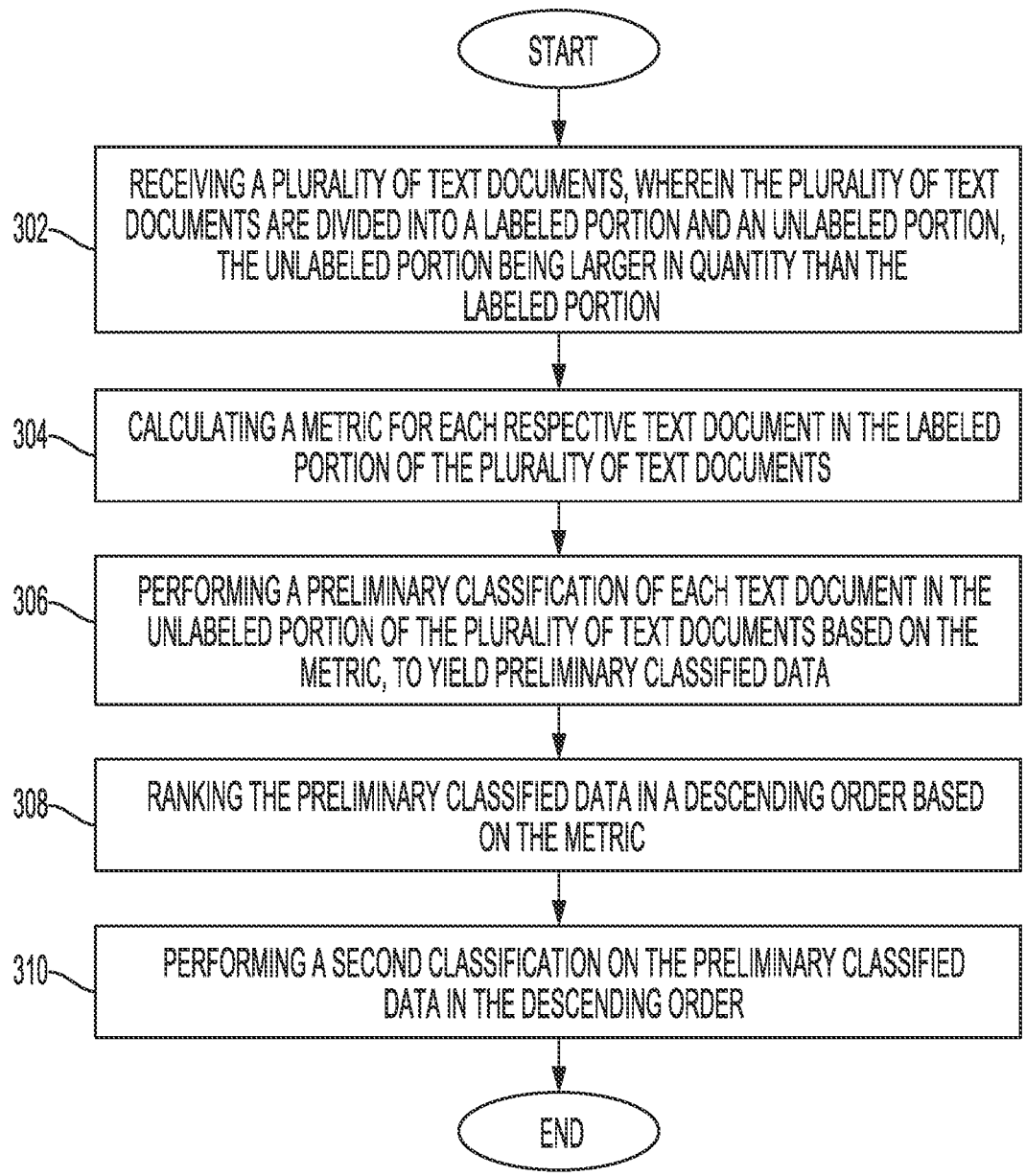
FIG. 3 illustrates a second example method embodiment.

FIG. 3 illustrates a second example method embodiment. In this example, the system receives a plurality of text documents, wherein the plurality of text documents are divided into a labeled portion and an unlabeled portion, the unlabeled portion being larger in quantity than the labeled portion (302). Examples of the text documents can include transcripts (such as transcripts from a call center) and online reviews. The system calculates, via a processor, calculating a metric for each respective text document in the labeled portion of the plurality of text documents (304), and performs, via the processor, a preliminary classification of each text document in the unlabeled portion of the plurality of text documents based on the metric, to yield preliminary classified data (306). The system then ranks, via the processor, the preliminary classified data in a descending order based on the metric (308) and performs, via the processor, a second classification on the preliminary classified data in the descending order (310). The second classification may be a semi-supervised classification.

In some configurations, the metric can be formed using: (1) a sentiment score of words within the each respective text document; (2) a function score based on a number of keywords detected within the each respective text document; and (3) a distance score identifying a distance vector of the each respective text document from a known classification. The function score based on a number of keywords can be an output of a function such as a factorial function of the number of keywords detected. In addition, the metric can be formed using a combination, such as a summation, of the respective scores and weights selected for each score. The weights can be determined based on a priority of the method.

In some configurations, the second classification can tag the text documents in the unlabeled portion as "reportable," or otherwise needing review by a human being.

In some configurations, the method iteratively improves itself by identifying, as part of the second classification, additional keywords to be used in calculating the metric. These additional keywords can be used in calculating a subsequent metric or metrics in a subsequent iteration. The additional keywords can be manually entered and/or approved by a human being supervising the operation, or can be automatically added to the database of keywords upon the system determining a certain likelihood that the newly identified keywords correspond to originally identified, positively labeled data.

The steps outlined herein are exemplary and can be implemented in any combination thereof, including combinations that exclude, add, or modify certain steps.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving a plurality of electronic text documents, wherein the plurality of electronic text documents are divided into a labeled portion and an unlabeled portion;
determining the unlabeled portion is larger in quantity than the labeled portion;
calculating, via a processor, a metric for each respective electronic text document in the labeled portion of the plurality of electronic text documents, based on:
determining a sentiment score of words within each respective electronic text document,
determining a function score based on a number of keywords detected within each respective electronic text document,
determining a distance score identifying a distance vector of each respective electronic text document from a known classification,
generating respective weights for the sentiment score, the function score, and the distance score,
computing the metric based on a weighted summation of the sentiment score, the function score, and the distance score, with their respective weights;
performing, via the processor, a preliminary classification of each electronic text document in the unlabeled portion of the plurality of electronic text documents based on the metric, to yield preliminary classified data;
ranking, via the processor, the preliminary classified data in a descending order based on the metric; and
performing, via the processor, a second classification on the preliminary classified data in the descending order, wherein the second classification includes identifying additional keywords used to calculate the metric, the additional keywords being approved prior to use.

2. The method of claim 1, wherein the function based on the number of keywords is a factorial function of the number of keywords detected.

3. The method of claim 1, wherein the respective weights are generated iteratively based on whether a priority at every iteration is to maximize recall, precision, or accuracy of a classification.

4. The method of claim 1, wherein the second classification tags text documents in the unlabeled portion for review by a human being.

5. The method of claim 1, wherein the additional keywords are used in calculating a subsequent metric in a subsequent iteration.

6. The method of claim 1, wherein the plurality of electronic text documents comprise a combination of transcripts and online reviews.

7. A system comprising:
a processor; and
a computer-readable storage medium having instructions stored which, when executed by the processor, cause the processor to perform operations comprising:

receiving a plurality of text documents, wherein the plurality of text documents are divided into a labeled portion and an unlabeled portion;
determining the unlabeled portion is larger in quantity than the labeled portion;
calculating a metric for each respective text document in the labeled portion of the plurality of electronic text documents, based on:
  determining a sentiment score of words within each respective electronic text document,
  determining a function score based on a number of keywords detected within each respective electronic text document,
  determining a distance score identifying a distance vector of each respective electronic text document from a known classification,
  generating respective weights for the sentiment score, the function score, and the distance score,
  computing the metric based on a weighted summation of the sentiment score, the function score, and the distance score, with their respective weights;
performing a preliminary classification of each text document in the unlabeled portion of the plurality of text documents based on the metric, to yield preliminary classified data;
ranking the preliminary classified data in a descending order based on the metric; and
performing a second classification on the preliminary classified data in the descending order, wherein the second classification includes identifying additional keywords used to calculate the metric, the additional keywords being approved prior to use.

8. The system of claim 7, wherein the function based on the number of keywords is a factorial function of the number of keywords detected.

9. The system of claim 7, wherein the respective weights are generated iteratively based on whether a priority at every iteration is to maximize recall, precision, or accuracy of a classification.

10. The system of claim 7, wherein the second classification tags text documents in the unlabeled portion for review by a human being.

11. The system of claim 7, wherein the additional keywords are used in calculating a subsequent metric in a subsequent iteration.

12. The system of claim 7, wherein the plurality of electronic text documents comprise a combination of transcripts and online reviews.

13. A non-transitory computer-readable storage medium having instructions stored which, when executed by a computing device, cause the computing device to perform operations comprising:
receiving a plurality of text documents, wherein the plurality of text documents are divided into a labeled portion and an unlabeled portion;
determining the unlabeled portion is larger in quantity than the labeled portion;
calculating a metric for each respective text document in the labeled portion of the plurality of electronic text documents, based on:
  determining a sentiment score of words within each respective electronic text document,
  determining a function score based on a number of keywords detected within each respective electronic text document,
  determining a distance score identifying a distance vector of each respective electronic text document from a known classification,
  generating respective weights for the sentiment score, the function score, and the distance score,
  computing the metric based on a weighted summation of the sentiment score, the function score, and the distance score, with their respective weights;
performing a preliminary classification of each text document in the unlabeled portion of the plurality of text documents based on the metric, to yield preliminary classified data;
ranking the preliminary classified data in a descending order based on the metric; and
performing a second classification on the preliminary classified data in the descending order, wherein the second classification includes identifying additional keywords used to calculate the metric, the additional keywords being approved prior to use.

14. The non-transitory computer-readable storage medium of claim 13, wherein the function based on the number of keywords is a factorial function of the number of keywords detected.

15. The non-transitory computer-readable storage medium of claim 13, wherein the respective weights are generated iteratively based on whether a priority at every iteration is to maximize recall, precision, or accuracy of a classification.

* * * * *